(12) United States Patent
Venkatakrishnan et al.

(10) Patent No.: US 11,842,543 B1
(45) Date of Patent: Dec. 12, 2023

(54) CAMERA SYSTEM FOR PROVIDING AN IN-STORE EXPERIENCE TO A REMOTE USER

(71) Applicant: STARBUCKS CORPORATION, Seattle, WA (US)

(72) Inventors: Natarajan Venkatakrishnan, Bellevue, WA (US); Kathryn K. Young, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/097,759

(22) Filed: Jan. 17, 2023

(51) Int. Cl.
*G06V 20/52* (2022.01)
*G06T 3/00* (2006.01)
*G06V 20/70* (2022.01)

(52) U.S. Cl.
CPC ............ *G06V 20/52* (2022.01); *G06T 3/0075* (2013.01); *G06V 20/70* (2022.01)

(58) Field of Classification Search
CPC ....... G06V 20/52; G06V 20/70; G06T 3/0075
See application file for complete search history.

(56) References Cited

U.S. PATENT DOCUMENTS

| 6,087,927 A * | 7/2000 | Battistini ................ A47F 10/02 340/286.09 |
| 2019/0099678 A1* | 4/2019 | Khan .................. A63F 13/5255 |
| 2020/0019754 A1* | 1/2020 | Adato .................... G06F 16/288 |
| 2021/0027485 A1* | 1/2021 | Zhang ....................... G06T 7/11 |

* cited by examiner

*Primary Examiner* — Zhitong Chen
(74) *Attorney, Agent, or Firm* — Kilpatrick Townsend & Stockton LLP

(57) ABSTRACT

A camera system can provide an in-store experience to a remote user according to some aspects described herein. In one example, a system can receive images from a camera that is oriented toward a display case at a physical location. The system can analyze the images to identify different types of objects in the display case. The system can then provide information about the different types of objects identified in the display case to a user device of a user that is remote from the physical location. The user device can receive the information and generate a graphical user interface that displays the information to the user.

20 Claims, 11 Drawing Sheets

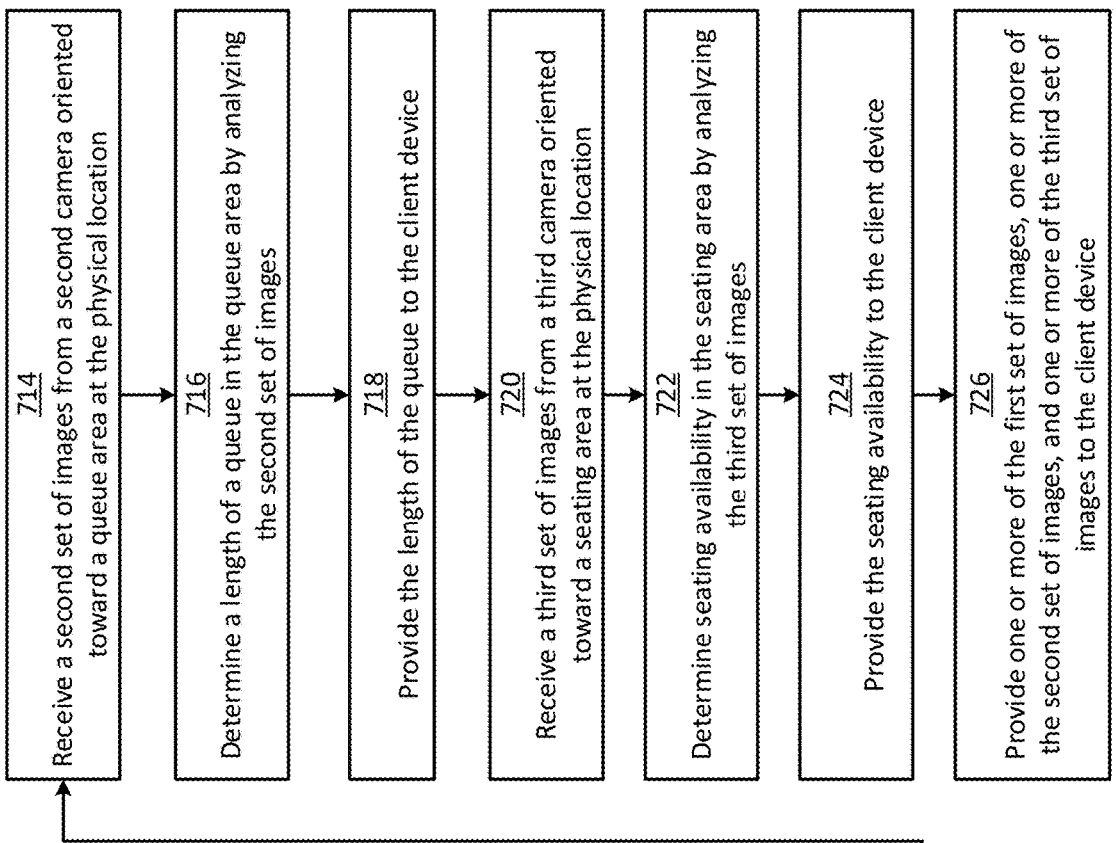
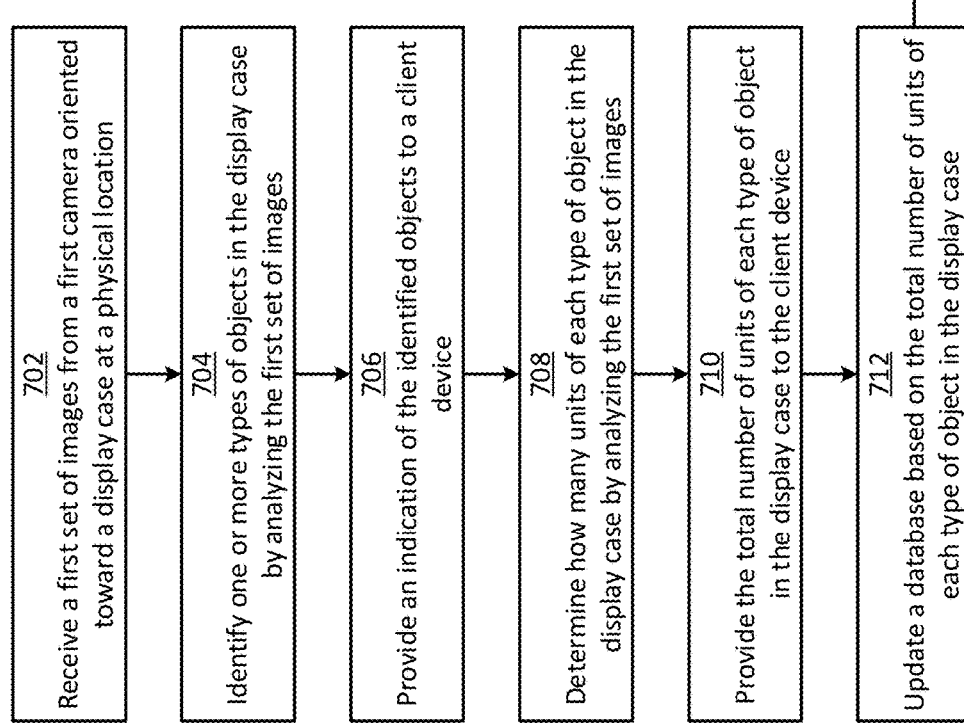
FIG. 7

CAMERA SYSTEM FOR PROVIDING AN IN-STORE EXPERIENCE TO A REMOTE USER

TECHNICAL FIELD

The present disclosure relates generally to camera systems and image processing. More specifically, but not by way of limitation, this disclosure relates to a camera system for providing an in-store experience to a remote user.

BACKGROUND

With advancements in technology and the desire for reduced physical contact (e.g., due to viruses like Covid-19), many entities now receive a majority of their orders from outside their physical store, such as through mobile applications, websites, and drive-through lanes. Because many people no longer actually enter a physical store to place an order, those people often miss out on many aspects of an in-store experience. For example, many food providers have display cases that display food to help create interest and convey availability, among other things. Such display cases have been a critical part of the in-store experience for generations. People that do not enter the physical store miss out on this key experience. Additionally, for those people that choose to enter a physical store, it can be challenging for them to predict the experience they will have beforehand. Existing tools such as mobile applications and websites provide little real-time information that can be used to gauge the conditions inside a store.

Summary

One example of the present disclosure includes a method. The method can involve receiving images from a camera that is oriented toward a display case at a physical location; analyzing the images to identify a plurality of different types of objects in the display case; and providing information about the plurality of different types of objects identified in the display case to a user device of a user that is remote from the physical location. The user device can be configured to generate a graphical user interface that displays the information to the user. Some or all of the method can be implemented by a server system.

Another example of the present disclosure can include a system. The system can include one or more processors. The system can also include one or more memories storing instructions that are executable by the one or more processors for causing the one or more processors to perform operations. The operations can include receiving images from a camera that is oriented toward a display case at a physical location; analyzing the images to identify a plurality of different types of objects in the display case; and providing information about the plurality of different types of objects identified in the display case to a user device of a user that is remote from the physical location. The user device can be configured to generate a graphical user interface that displays the information to the user.

Still another example of the present disclosure can be a non-transitory computer-readable medium comprising program code that is executable by one or more processors for causing the one or more processors to: receive images from a camera that is oriented toward a display case at a physical location; analyze the images to identify a plurality of different types of objects in the display case; and provide information about the plurality of different types of objects identified in the display case to a user device of a user that is remote from the physical location. The user device can be configured to generate a graphical user interface that displays the information to the user.

BRIEF DESCRIPTION OF THE DRAWINGS

FIG. 7 shows a flowchart of an example of a process for analyzing three sets of images from three different cameras according to some aspects of the present disclosure.

DETAILED DESCRIPTION

Figure 1:
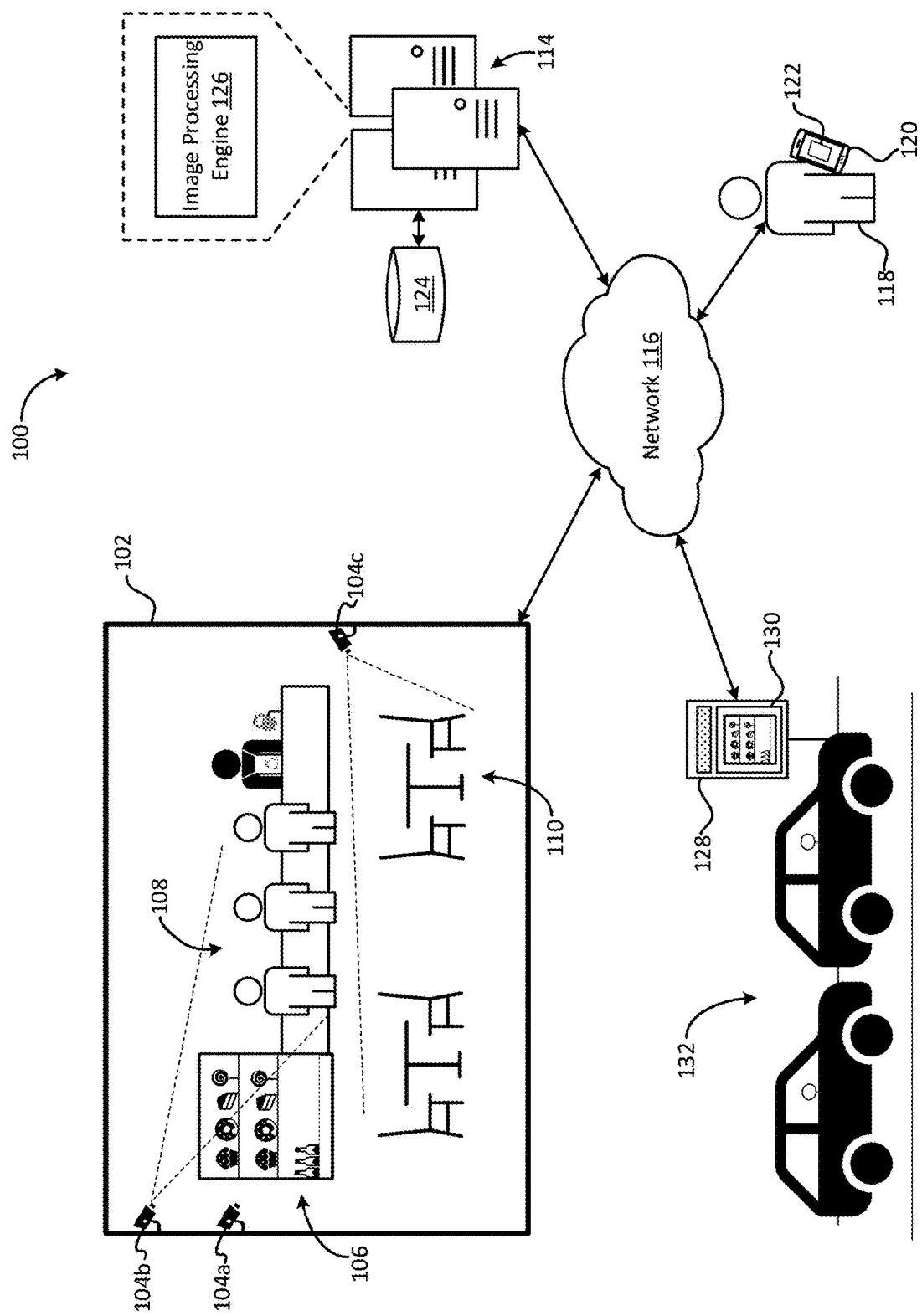
FIG. 1 shows a block diagram of an example of a system for providing an in-store experience to a remote user according to some aspects of the present disclosure.

Certain aspects and features of the present disclosure related to a camera system for providing aspects of an in-store experience to a user. The camera system can include a first camera oriented toward a display case in a physical location. The first camera can capture images of the display case and transmit the images to a backend server system, which can process the images using an image processing engine. The server system can then provide the images and information derived therefrom to a user outside the physical location. In some examples, the user may be a driver of a vehicle in a drive-through lane associated with the physical location. In those examples, the server system can transmit the images and the derived information to a drive-through terminal for viewing by the user. In other examples, the user may be located offsite, such as at their home or a friend's home. In those examples, the server system can transmit the images and the derived information to user's mobile phone, laptop computer, or other user device for viewing by the user. Either way, the user can obtain insight into the content of the display case without setting foot inside the physical location. This may help the user have a display case experience similar to being in-store.

In some examples, the camera system can also include a second camera oriented toward a queue area of the physical location. The queue area can be a predesignated area for people to wait in line. People may wait in the queue area to obtain services or objects, like food or beverages; to access bathrooms; or for other reasons. The second camera can capture images of the queue area and transmit the images to the backend server system, which can process the images using an image processing engine. The server system can then provide the images and information derived therefrom to a user outside the physical location. For example, the server system can process the images to determine a wait time associated with a queue in the queue area. The server system can then transmit the wait time to a user device of the user. That way, the user can obtain insight into the length of the queue without setting foot inside the physical location. This may help the user make decisions similar to those they might make if they were in-store, such as whether to obtain an object from the physical location or choose another location that is less busy.

In some examples, the camera system can also include a third camera oriented toward a seating area of the physical location. The seating area can be a predesignated area for people to sit in the physical location. People may sit in the seating area to lounge, eat, drink, meet with others, or for other reasons. The third camera can capture images of the seating area and transmit the images to the backend server system, which can process the images using an image processing engine. The server system can then provide the images and information derived therefrom to a user outside the physical location. For example, the server system can process the images to determine seating availability in the seating area. The server system can then transmit the seating availability to a user device of the user. That way, the user can obtain insight into the seating availability without setting foot inside the physical location. This may help the user make decisions similar to those they might make if they were in-store, such as whether to meet friends at the physical location or choose another location that is less busy.

These illustrative examples are provided to present the reader with the general subject matter discussed herein and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for providing an in-store experience to a remote user according to some aspects of the present disclosure. The system 100 includes a physical location 102, such as a store. The physical location 102 is associated with an entity, such as Starbucks®.

The physical location 102 can include a first camera 104a oriented toward a display case 106 usable to display items, such as food or beverages. The display case 106 can include a covered display area, which may be at least partially enclosed in glass or plastic. The covered display area may be primarily used by store personnel to display and retrieve items as needed. The covered display area can be maintained at room temperature or cooled, depending on its contents. The display case 106 may also include a chill well for ready-to-drink or ready-to-eat items, such as bottled beverages and sandwiches. The chill well may be primarily used by patrons to grab their desired items. The chill well may be cooled to any suitable temperature, such as to below 40° F. The first camera 104a can capture images of some or all of the display case 106 and transmit them to a server system 114 via a network 116, such as a local area network or the Internet. The server system 114 may be associated with the same entity that operates the physical location 102.

The physical location 102 may additionally or alternatively include a second camera 104b oriented toward a queue area 108. In the queue area 108, one or more people may wait in line. For example, one or more people may wait in line to obtain or pay for their items. The queue area 108 may extend along a length of the physical location 102 and may terminate at specific location, such as a sales terminal, a counter, or a bathroom. In some examples, the physical location 102 may have multiple queues in the queue area 108, which may lead to different terminating points. The second camera 104b can capture images of the one or more queues in the queue area 108 and transmit them to the server system 114 via the network 116.

The physical location 102 may additionally or alternatively include a third camera 104c oriented toward a seating area 110. The seating area 110 may include any number of tables, seats (e.g., chairs, stools, or couches), and the like. People may use the seating area 110 to lounge, eat, drink, or perform other activities. The third camera 104c can capture images of the seating area 110 and transmit them to the server system 114 via the network 116.

The server system 114 can include any number and combination of networked computing devices in any suitable arrangement, such as a computing cluster. In some examples, the server system 114 can include a cloud computing environment that can execute microservices and other software for performing the functionality described herein.

The server system 114 can receive the images from the cameras 104a-c and process them using an image processing engine 126. After processing the images, the server system 114 may transmit the one or more of the processed images (e.g., as a video feed) to a client device. This may help a user of the client device obtain insights into the conditions inside the physical location 102 and remotely experience at least some aspects of being in-store.

For example, a driver may operate a vehicle to access a drive-through lane 132 associated with the physical location 102. The drive-through lane 132 may include a drive-through terminal 128, which may be one type of client device. The drive-through terminal 128 can include a computing device, an intercom system, and a display 130. Examples of the display can include a light emitting diode (LED) display or a liquid crystal display (LCD). The intercom system can include a speaker and a microphone, through which the driver can communicate to place an order. Normally, the display 130 may show a predefined menu of items. But in some examples, the display 130 may also be capable of showing the one or more images received from the server system 114. For example, the drive-through terminal 128 can receive one or more images showing the content of the display case 106 and output them on the display 130. A driver at the drive-through can view the one or more images and, for example, determine which items may be out of stock, without stepping foot inside the physical location 102.

As another example, a user 118 located outside the physical location 102 may operate a user device 120 to place orders or perform other tasks related to the physical location 102. For instance, the user 118 may operate the user device 120 to access a website or execute a mobile application associated with the physical location 102 to perform various tasks related to the physical location 102. Examples of the user device 120 may include a mobile phone, a laptop computer, a desktop computer, a tablet, or a wearable device such as a smart watch or smart glasses. If the user 118 would like to know what items are available in the display case 106, how long a line is in the queue area 108, or if there is any available seating in the seating area 110, the user 118 can select one or more options of a graphical user interface 122 to receive corresponding information from the server system 114. For example, the user 118 can select an option of the graphical user interface 122 to see the content of the display case 106. In response to this selection, the server system 114 can transmit one or more images from the first camera 104a to the user device 120 for display to the user 118. As another example, the user 118 can select an option of the graphical user interface 122 to see the queue area 108. In response to this selection, the server system 114 can transmit one or more images from the second camera 104b to the user device 120 for display to the user 118. As still another example, the user 118 can select an option of the graphical user interface 122 to see the seating area 110. In response to this selection, the server system 114 can transmit one or more images from the third camera 104c to the user device 120 for display to the user 118. In this way, the system 100 can help the user 118 obtain live (e.g., real time or near-real time) information about the conditions inside the physical location 102, without entering the physical location 102. The user 118 can then make decisions based on this live information. For example, if the queue is too long or there is no available seating at the physical location 102, the user 118 may decide to go to a different physical location, such as another Starbucks® location.

In some examples, the server system 114 can process the images using the image processing engine 126 to derive information about the conditions inside the physical location 102. The server system 114 can then provide the information to client devices that are located outside the physical location 102, such as the drive-through terminal 128 and the user device 120. For example, the server system 114 can process the images from the first camera 104a to determine which items are present in and absent from the display case 106. The server system 114 can also process the images to determine how many of each item is present in the display case 106 at a given point in time. The server system 114 can then provide this information via the network 116 to the user device 120, so that the user 118 can determine the content of the display case 106. Additionally or alternatively, the server system 114 can update a database 124 with some or all of this information, for example to track inventory across one or more physical locations.

As another example, the server system 114 can process the images from the second camera 104b to determine a length of a line in the queue area 108. The length may be quantified as a number of minutes (e.g., there is a 5 minute wait), a number of people (e.g., there are 8 people in line), or by using any other suitable measure. The server system 114 can then provide this information to the user device 120, so that the user 118 can determine the line's length. This may help the user 118 decide, for example, whether to place an order at the physical location 102 or somewhere else that may be less busy.

As still another example, the server system 114 can process the images from the third camera 104c to determine seating availability in the seating area 110. The seating availability may be quantified in binary terms (e.g., seating is available or unavailable) or by using any other suitable measure. The server system 114 can then provide this information to the user device 120, so that the user 118 can determine whether seating is available. This may help the user 118 decide, for example, whether to have a meeting at the physical location 102 or somewhere else.

Figure 2:
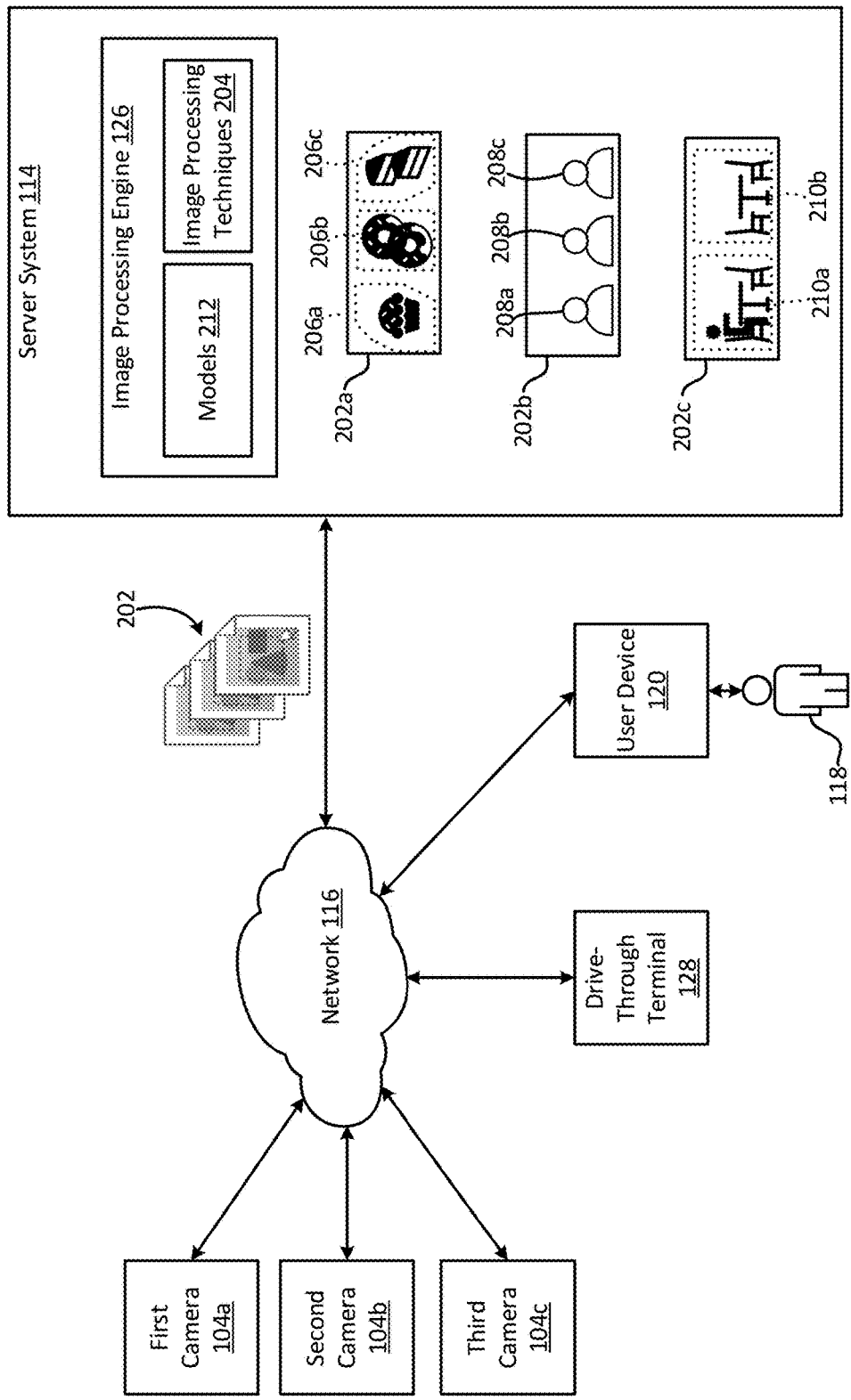
FIG. 2 shows a block diagram of an example of a system for processing images from multiple cameras to provide an in-store experience to a remote user according to some aspects of the present disclosure.

More details about the image processing engine 126 will now be described below with respect to FIG. 2. Referring now to FIG. 2, in general, the cameras 104a-c can transmit images 202 via the network 116 to the server system 114. The server system 114 can receive the images 202 and process them using the image processing engine 126, for example to determine some or all of the information described above.

Prior to processing the images 202, the image processing engine 126 may undergo a calibration phase. During the calibration phase, the image processing engine 126 may be calibrated using calibration images. A calibration image can be an image used for calibration purposes during the calibration phase, as opposed to a new image 202 that is to be processed during an active phase of the image processing engine 126. For example, the image processing engine 126 may be calibrated (e.g., tuned) using calibration images depicting an empty display case, so that the image processing engine 126 can differentiate between empty portions of the display case and filled portions of the display case. This may also allow the image processing engine 126 to differentiate between background content, such as the structure of the display case, and target content, such as the objects in the display case. As another example, the image processing engine 126 may be configured using calibration images depicting an empty seating area, so that the image processing engine 126 can differentiate between empty seats in the seating area and taken seats in the seating area. As yet another example, the image processing engine 126 may be configured using calibration images depicting an empty queue area, so that the image processing engine 126 can differentiate between an empty queue area and an active queue area.

In some examples, the calibration process may include tuning one or more models 212 of the image processing engine 126. This tuning can involve training or otherwise configuring the models 212. The models 212 may include one or more machine learning models, such as neural networks, support vector machines, k-means clustering models, trees, etc. During the calibration process, the models 212 may be tuned using tuning data. The tuning data can be any data usable to tune a model. For example, the models 212 can be trained by applying a supervised or semi-supervised learning process using labeled training data. As one particular example, an object detection model can be trained using training data that includes thousands or millions of labeled images of different types of objects (e.g., items). Once trained, the object detection model may be capable of detecting the presence of the different types of objects in the display case.

In some examples, the image processing engine 126 can be calibrated to correlate different pixel regions of an image to different types of objects, such as different types of food or beverages. For example, the image processing engine 126 may be calibrated to identify pixel region 206a as corresponding to muffins, pixel region 206b as corresponding to donuts, and pixel region 206c as corresponding to cake slices. Once calibrated, the image processing engine 126 can parse a new image 202a into pixel regions 206a-c using one or more image processing techniques 204, such as segmentation. The image processing engine 126 can then analyze each pixel region 206a-c using the tuned models 212 and/or image processing techniques 204 to determine whether the corresponding object is present or absent from the pixel region.

If the image processing engine 126 determines that the corresponding object is present in the pixel region, the image processing engine 126 can further analyze the pixel region to determine how many units of the object are present in the pixel region. For example, if the image processing engine 126 determines that at least one muffin is present in pixel region 206a, the image processing engine 126 can further analyze the pixel region to determine how many muffins are present in the pixel region. To determine how many units of an object are present in the pixel region, the models 212 may be tuned during the calibration phase to be able to identify different parts of an object. For instance, the models 212 may be tuned using full and partial images of the object from a variety of angles, so that the models 212 can identify subparts of a partially obscured object in an image. That way, if one object is partially obscured from view by another object (e.g., if a farther cupcake is partially obscured from view by a closer cupcake), the image processing engine 126 can still detect the presence of the other object and add it to the total quantity.

In addition to processing images from the first camera 104a, in some examples the image processing engine 126 can process images from the second camera 104b to determine the length of a line in the queue area. For example, the image processing engine 126 can receive a new image 202b from the second camera 104b. The image processing engine 126 can then execute one or more models 212 to determine the locations of heads 208a-c in the new image 202b. The models 212 may have previously been tuned during the calibration phase to identify human heads 208a-c in images. For instance, the models 212 may have been trained on training data that includes images depicting heads from a variety of angles, with and without hats, with and without glasses, etc., so that the trained model can learn to identify heads in images. When the image processing engine 126 then receives the new image 202b from the second camera 104b, the image processing engine 126 can apply the models 212 to identify the heads 208 in the image 202b. The image processing engine 126 may then count the number of heads identified in the image 202b, which can serve as a proxy for the number of people in line. From this information, the image processing engine 126 may determine the length of a line in the queue area. The length of the line may be quantified using any suitable measure. For example, the length of the line may be quantified by the number of people detected in the image 202b. Alternatively, the length of the line may be quantified by a number of minutes, such as five minutes. In some examples, the number of minutes may be estimated by multiplying the number of people detected in the image 202b by an average wait time-per-person.

Figure 3:
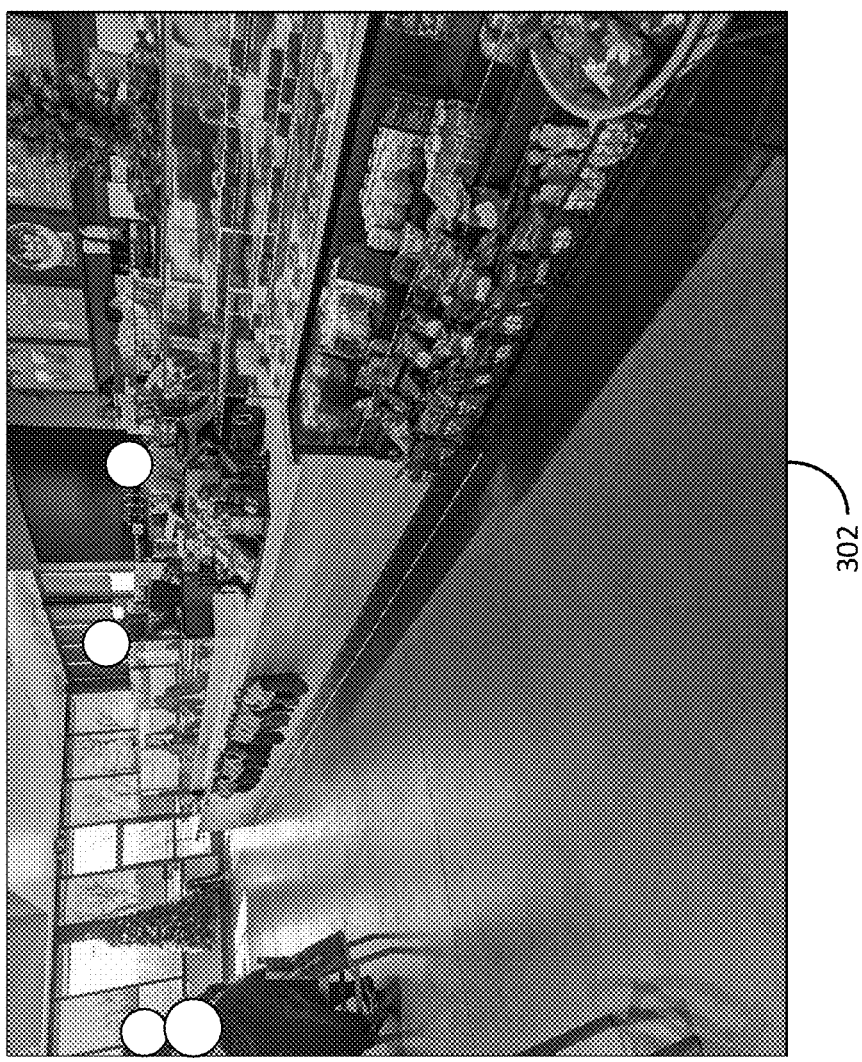
FIG. 3 shows an example of an anonymized image of a queue area according to some aspects of the present disclosure.

Additionally or alternatively to determining the length of a line in the queue area, in some examples the image processing engine 126 can apply one or more anonymization techniques to the identified heads in the images to obscure the heads. The anonymization techniques can include image processing techniques 204, such as blurring or pixelating, configured to obscure portions of an image. That way, if images from the second camera 104b are provided to the user device 120, the privacy of people at the physical location 102 is protected. One example of such an anonymized image 302 is shown in FIG. 3. It will be appreciated that although the above examples are described with respect to head detection, similar principles can be applied to detect faces or other body parts in images, count the body parts, and optionally obscure them.

In some examples, the image processing engine 126 can also process images from the third camera 104c to determine seating availability in the seating area. For example, the image processing engine 126 can receive a new image 202c from the third camera 104c. The image processing engine 126 can then execute one or more models 212 to determine the locations of seats 210a-b in the new image 202c. The models 212 may have previously been tuned during the calibration phase to identify seats in images. For instance, the models 212 may have been trained on training data that includes labeled images depicting different kinds of seats from various angles, so that the trained model can learn to identify seats in images. When the image processing engine 126 then receives the new image 202c from the third camera 104c, the image processing engine 126 can apply the models 212 to identify the seats in the image 202c. Having identified the seats in the images, the image processing engine 126 can next determine whether they are empty or full. Counting the number of empty seats may provide a rudimentary estimate of whether there is available seating in the seating area. For a more complex analysis, the image processing engine 126 can perform a table-level analysis. If at least one seat is taken at a table, all of the seats associated with that table may be designated as taken by the image processing engine 126, even if the seats are actually empty. This is because many people will not want to sit at a table with a stranger, so even if the seats are empty, they are not usable.

Figure 4:
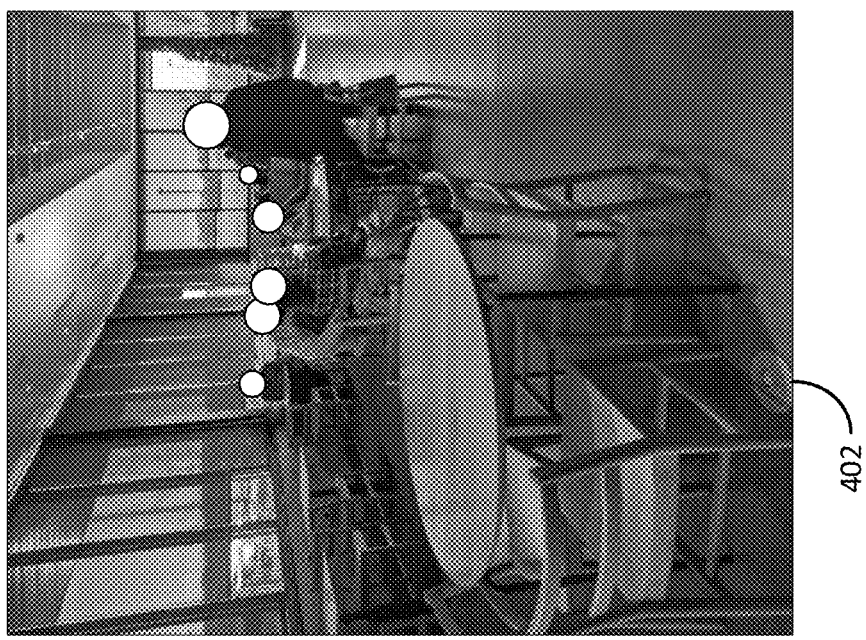
FIG. 4 shows an example of an anonymized image of a seating area according to some aspects of the present disclosure.

In addition to determining the seating availability in the seating area, in some examples the image processing engine 126 can apply the techniques described above to identify heads, faces, or other body parts in the new image 202c and obscure them. That way, if the images from the third camera 104c are provided to the user device 120, the privacy of people at the physical location 102 is protected. One example of such an anonymized image 402 is shown in FIG. 4.

Figure 5:
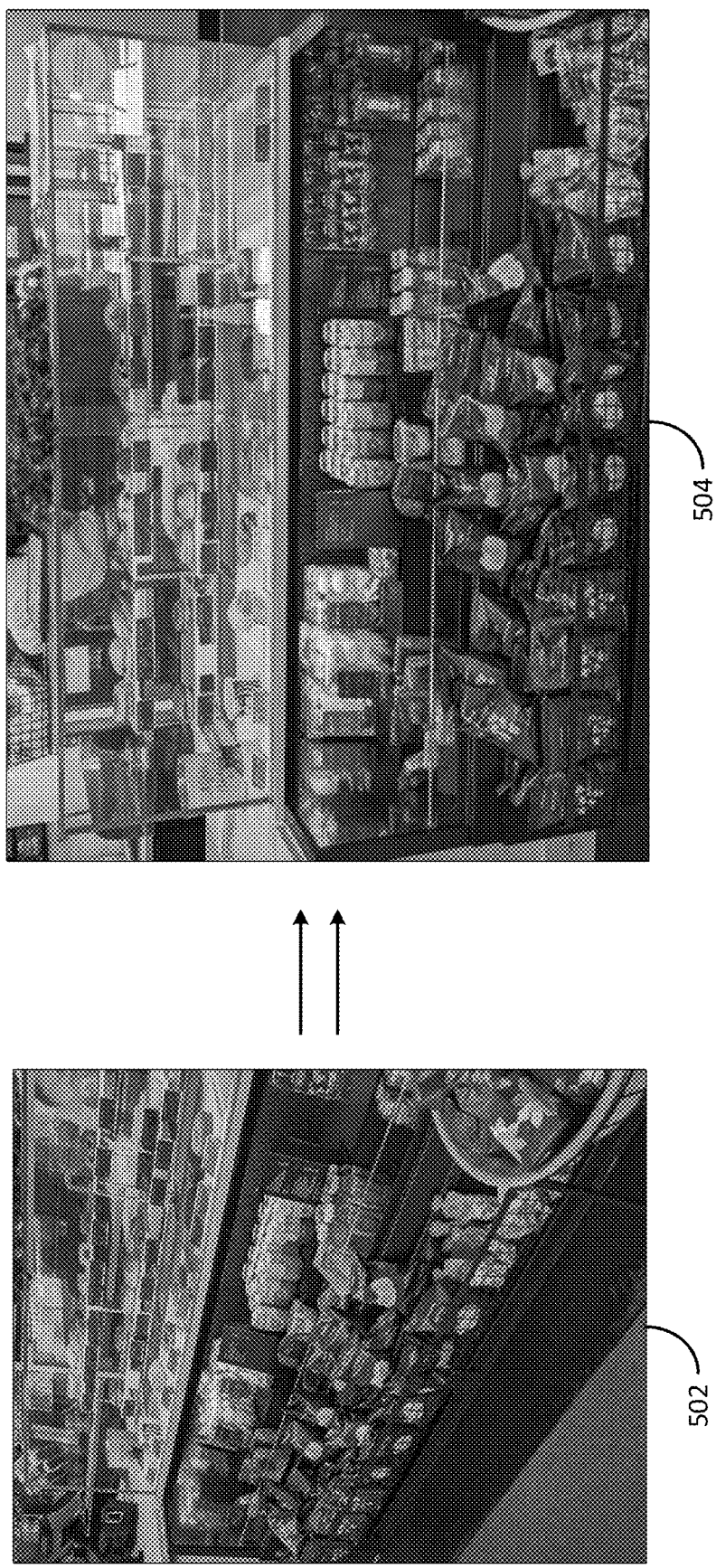
FIG. 5 shows an example of a modified image that has a transformed perspective view according to some aspects of the present disclosure.

In some examples, the image processing engine 126 can apply one or more image processing techniques 204 to modify a perspective of an image 202 received from one of the cameras 104a-c. For example, the first camera 104a may be positioned at an angle that captures images of the display case from a first perspective. Because it may be difficult to analyze the content of the display case from the first perspective, the image processing engine 126 can apply one or more image transformation techniques (e.g., homography techniques, skewing, or warping) to modify the image to depict the display case at a second perspective that is different from the first perspective. One example of this process is shown in FIG. 5, where by the original image 502 is transformed into a modified image 504 that depicts the display case from a different perspective than the original image 502. The modified image 504 may then be analyzed by the image processing engine 126, or by a user 118 viewing the modified image 504 on their user device 120, for example to determine the content of the display case as described above.

Figure 6:
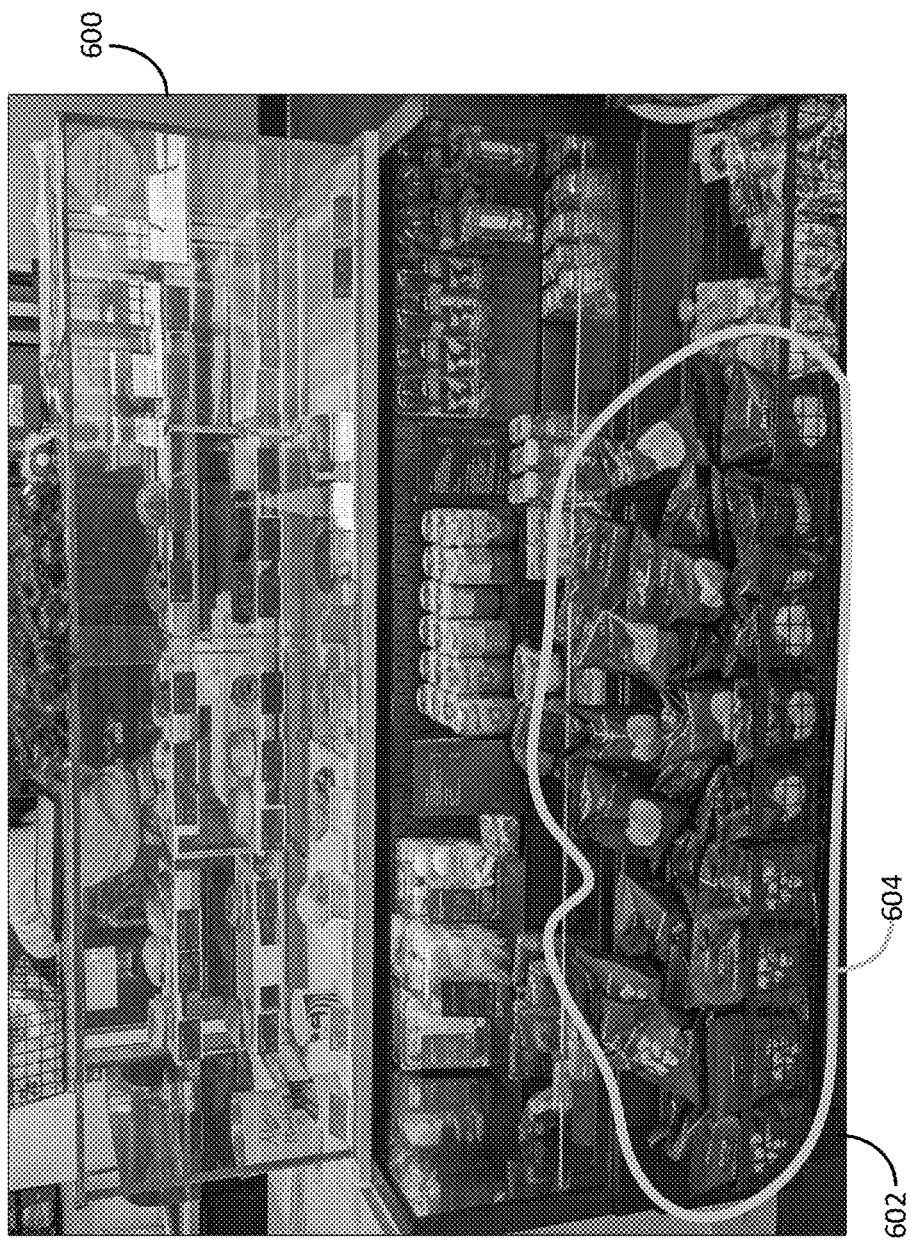
FIG. 6 shows an example of a modified image with highlighted content according to some aspects of the present disclosure.

Continuing with FIG. 2, in some examples the image processing engine 126 can also perform other modifications to an image 202 from one of the cameras 104a-c. For example, the image processing engine 126 can remove background content from an image 202 to produce a modified image with reduced background content. This may simplify processing of the image in subsequent steps or make certain aspects of the image easier to digest for a viewer, such as user 118 or a driver at the drive-through. As another example, the server system 114 can access an account history of the user 118, determine that the user 118 previously obtained a particular object, determine that that particular object is present in the display case, and highlight that object in an image of the display case. To avoid cluttering the image, only objects that have been obtained at least a predefined number of times may be highlighted, so that more only the most-frequently obtained objects are highlighted. One example of such a modified image 600 is shown in FIG. 6. In this example, the modified image 600 highlights an object-of-interest 604 in the display case 602 by enclosing it with a border. But in other examples, the modified image 600 can highlight the object-of-interest in any other suitable way, such as by coloring it, deemphasizing other portions of the image, or pointing to it with an arrow. The modified image 600 may then be provided to the user 118, for example to help visually indicate to the user 118 that an object-of-interest is available in the display case.

Additionally or alternatively, the image processing engine 126 can select predefined content to provide to a client device based on an image 202 received from one of the cameras 104*a-c*. For example, the image processing engine 126 can determine that the image 202 depicts an object in the display case, such as a food item. The image processing engine 126 can then select predefined content to provide to the client device based on the depicted object. As one example, the predefined content can include a pre-generated textual description of the object. As another example, the predefined content can include a pre-generated image of the object, where the pre-generated image is different from the live image 202 received from the camera. For instance, the pre-generated image may include an enhanced depiction of the object, such as a high-definition photograph of the object or a professional photograph of the object (e.g., a food item) that is stylized. After selecting which predefined content to provide to the client device, the server system 114 can provide the selected content to a client device for display to a viewer. The selected content may or may not be provided to the client device in conjunction with the image 202. For example, the textual description can be provided as an overlay on the image 202, which may produce an augmented reality (AR) experience.

As alluded to above, in some examples the image processing engine 126 can generate a virtual reality (VR) experience or an AR experience based on one or more images received from the cameras 104*a-c*. For example, the image processing engine 126 can generate a virtual reality experience that includes one or more virtual items (e.g., virtual characters, virtual food items, virtual seating, virtual furniture items, etc.) based on one or more images from the cameras 104*a-c*. The virtual items may be generated using a 3D rendering engine, such as the Unreal Engine by Epic Games®. As another example, the image processing engine 125 can generate an augmented reality experience that includes one or more virtual items as a virtual overlay on one or more images from the cameras 104*a-c*. Such experiences may be interactive, for example so that a user can engage with the virtual items to perform tasks.

Referring now to FIG. 7, shown is a flowchart of an example of a process for analyzing three sets of images from three different cameras 104*a-c* according to some aspects of the present disclosure. Other examples may involve more operations, fewer operations, different operations, or a different order of operations than is shown in FIG. 7. For consistency, the operations of FIG. 7 are described below with reference to the components of FIGS. 1-2 described above.

In block 702, a server system 114 receives a first set of images from a first camera 104*a* oriented toward a display case 106 at a physical location 102. In some examples, the server system 114 can receive the first set of images from multiple cameras oriented toward the display case 106 at different angles at the physical location 102. Having images of the display case 106 taken from different angles may help with subsequent processing.

In block 704, the server system 114 identifies one or more types of objects in the display case 106 by analyzing the first set of images. Analyzing the first set of images can involve analyzing the raw images or derivatives thereof. For example, the server system 114 may generate one or more modified images based on the first set of images, where the modified images show the display case at a different perspective than the first set of images. The server system 114 can then use the modified images with the transformed perspective view to more easily or accurately identify the one or more types of objects in the display case 106.

The server system 114 can apply various techniques to identify one or more types of objects in the display case 106. For example, the server system 114 can apply an object detection model to the first set of images (e.g., the raw images or their derivatives) to identify different types of objects in the display case 106. As another example, the server system 114 can detect the presence or absence of an object in the display case 106 by comparing (i) a first image in which a pixel region associated with the object is empty to (ii) a second image in which the pixel region associated with the object is filled. The pixel region can be considered empty when it does not show the target object, and the pixel region can be considered filled when it shows at least one unit of the target object. The first image may be collected during a calibration process and the second image may be associated with the first set of images. From this comparison, the server system 114 can detect that the pixel region is filled, determine that the object corresponds to the pixel region, and thus determine that the object is present in the display case 106.

In block 706, the server system 114 provides an indication of the identified objects to a client device. For example, the server system 114 can transmit a list of available objects to the drive-through terminal 128 for display to a driver. As another example, the server system 114 can transmit a list of available objects to the user device 120 for display to the user 118. The list can specify which objects are available and/or unavailable in the display case 106. The server system 114 can electronically transmit this information to the client device via the network 116.

In block 708, the server system 114 determines how many units of each type of object are present in the display case 106 by analyzing the first set of images. Analyzing the first set of images can involve analyzing the raw images or derivatives thereof, such as the modified images with the transformed perspective view described above. As one example, the server system 114 can apply one or more models 212 and/or one or more image processing techniques 204 to the first set of images to identify different portions of an identified type of object. The server system 114 can then distinguish and count the different portions to estimate the total number of units of the identified type of object that are present in the display case 106. For instance, the server system 114 can apply one or more models 212 to determine that there are five chocolate chip cookies in the display case 106.

In block 710, the server system 114 provides the total number of units of each type of object in the display case 106 to the client device. For example, the server system 114 can transmit the total number of units of each type of object in the display case 106 to the drive-through terminal 128 for display to a driver. As another example, the server system 114 can transmit the total number of units of each type of object in the display case 106 to the user device 120 for display to the user 118. The server system 114 can electronically transmit this information to the client device via the network 116.

In block 712, the server system 114 updates a database 124 based on the total number of units of each type of object in the display case 106. In some examples, the database 124 may be internal to the server system 114. Alternatively, the database 124 may be external and accessible to the server system 114. The database 124 may include one or more databases or tables. The database 124 may be updated over time with information about the content of one or more display cases at one or more physical locations associated with one or more entities. In some examples, the server system 114 can automatically determine that a certain object is low in stock at a physical location 102 based on the content of the database 124. The server system 114 can then automatically order more of that object, for example to address or preempt shortages of the object.

In block 714, the server system 114 receives a second set of images from a second camera 104b oriented toward a queue area 108 at the physical location 102. In some examples, the server system 114 can receive the second set of images from multiple cameras oriented toward the queue area 108 at different angles at the physical location 102. Having images of the queue area 108 taken from different angles may help with subsequent processing.

In block 716, the server system 114 determines a length of a queue (e.g., a line of people) in the queue area 108 by analyzing the second set of images. Analyzing the second set of images can involve analyzing the raw images or derivatives thereof. For example, the server system 114 may generate one or more modified images based on the second set of images, where the modified images show the queue area 108 at a different perspective than the second set of images. The server system 114 can then use the modified images with the transformed perspective view to more easily or accurately identify the length of the queue in the queue area 108.

The server system 114 can apply different techniques to determine the length of a queue in the queue area 108. For example, the server system 114 can apply an object detection model to the second set of images (e.g., the raw images or their derivatives) to identify individual people in the queue area 108. As another example, the server system 114 can detect the presence or absence of people in the queue area 108 by comparing a first image depicting an empty queue area 108 to a second image depicting one or more people in the queue area 108. The first image may be collected during a calibration process and the second image may be associated with the second set of images. From this comparison, the server system 114 can determine how much of the queue area 108 is filled with people and use that amount as a proxy for the queue length.

In block 718, the server system 114 provides the length of the queue to a client device. For example, the server system 114 can transmit the length of the queue to the user device 120 for display to the user 118. The server system 114 can electronically transmit this information to the client device via the network 116.

In block 720, the server system 114 receives a third set of images from a third camera 104c oriented toward a seating area 110 at the physical location 102. In some examples, the server system 114 can receive the third set of images from multiple cameras oriented toward the seating area 110 at different angles at the physical location 102. Having images of the seating area 110 taken from different angles may help with subsequent processing.

In block 722, the server system 114 determines seating availability in the seating area 110 by analyzing the third set of images. Analyzing the third set of images can involve analyzing the raw images or derivatives thereof. For example, the server system 114 may generate one or more modified images based on the third set of images, where the modified images show the seating area 110 at a different perspective than the third set of images. The server system 114 can then use the modified images with the transformed perspective view to more easily or accurately determine seating availability in the seating area 110.

The server system 114 can apply different techniques to determine seating availability in the seating area 110. For example, the server system 114 can apply an object detection model to the third set of images (e.g., the raw images or their derivatives) to identify people and seats in the seating area 110. As another example, the server system 114 can detect the presence or absence of people in seats of the seating area 110 by comparing a first image depicting empty chairs in the seating area 110 to a second image in which the seats include one or more people. The first image may be collected during a calibration process and the second image may be associated with the third set of images. From this comparison, the server system 114 can determine whether each of the seats is taken.

The seating availability can be quantified in any suitable way. In some examples, the seating availability may be quantified as a total number of available seats (e.g., there are 3 seats available). In other examples, the seating availability may be quantified in wholistic binary terms (e.g., seating is available or unavailable).

In block 724, the server system 114 provides the seating availability to a client device. For example, the server system 114 can transmit the seating availability to the user device 120 for display to the user 118. The server system 114 can electronically transmit this information to the client device via the network 116.

In block 726, the server system 114 provides one or more of the first set of images, one or more of the second set of images, and one or more of the third set of images to the client device. This may involve providing the raw images or derivatives thereof to the client device. For example, the server system 114 can select an image from the first set of images, generate a modified version of the image that highlights content or removes background content, and provide the modified version of the image to the client device. As another example, the server system 114 can select an image from the first set of images, generate a modified version of the image with a transformed perspective view, and provide the modified version of the image to the client device. As still example, the server system 114 can select an image from the second set of images or third set of images, generate a modified version of the image that highlights content or removes background content, and provide the modified version of the image to the client device. As yet another example, the server system 114 can select an image from the second set of images or third set of images, generate an anonymized version of the image that obscures faces or other personally identifying information (e.g., credit card numbers or name tags) to protect privacy, and provide the anonymized version of the image to the client device.

Figure 10:
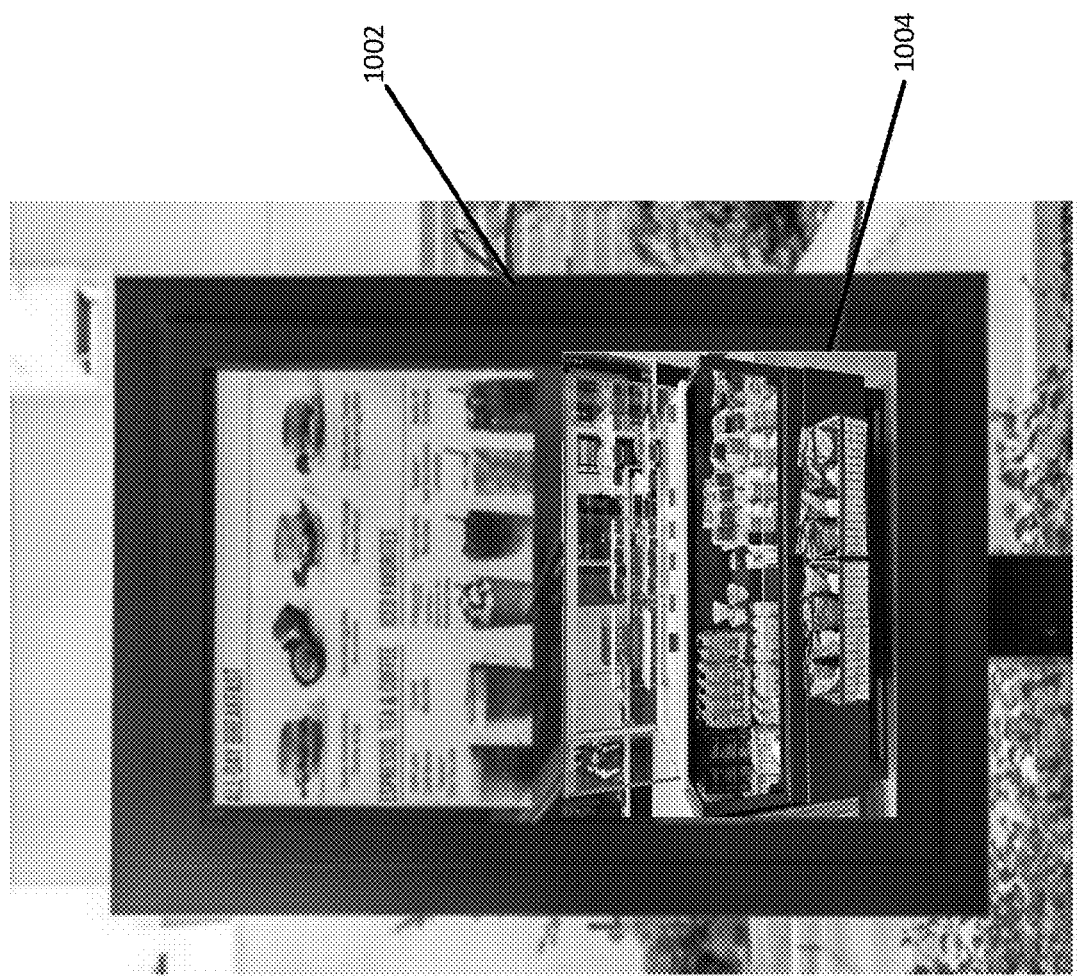
FIG. 10 shows an example of a drive-through terminal with streamed video content according to some aspects of the present disclosure.

In some examples, the server system 114 can provide the images as video streams to the client device. For example, the server system 114 can receive the first set of images as a video stream of the display case 106, modify the video stream, and transmit the modified video stream to the client device. Modifying the video stream may involve compressing the video stream or modifying one or more images in the video stream, for example to anonymize the images therein or add a virtual overlay to generate an augmented reality experience. One example of such a video stream is shown in FIG. 10, which depicts a video stream 1004 of a display case on the drive-through terminal 1002. Similar processes can be also applied to the second set of images and the third set of images, respectively. For example, the server system 114 can receive the second set of images or the third set of images as a video stream, modify the video stream, and transmit the modified video stream to the client device.

In some examples in which the client device is a user device 120, the video streams may provide live information about the current conditions in the physical location 102 to the user 118. The user 118 can operate their user device 120 to view the video streams and other provided information. For example, the user 118 can interact with a graphical user interface 122 generated by a mobile application, a website browser, or other software executing on the user device 120 to view this information.

Figure 8:
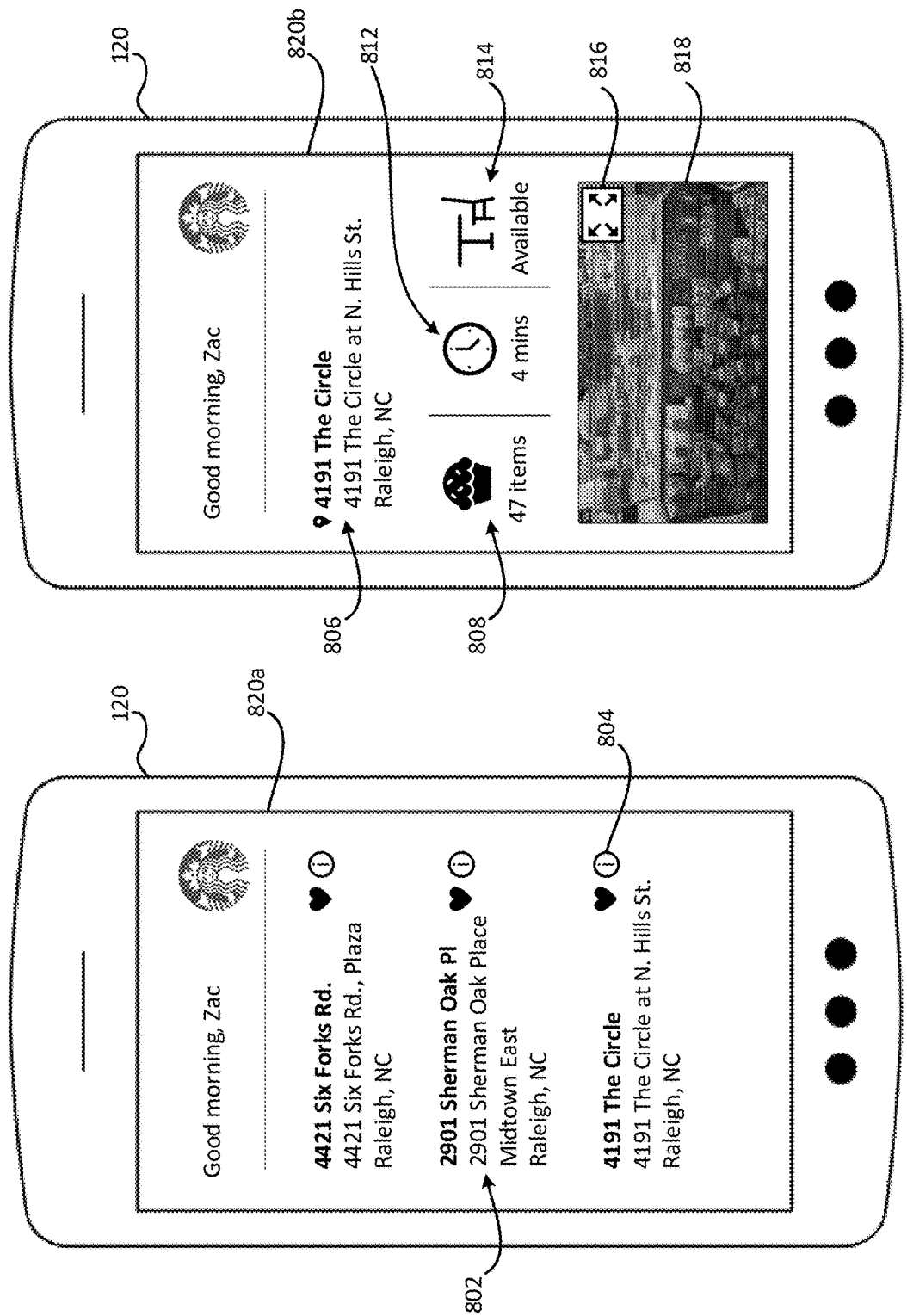
FIGS. 8A-B show examples of graphical user interfaces on a user device according to some aspects of the present disclosure.

One example of such a graphical user interface 122 is shown in FIG. 8A. As shown, the graphical user interface 122 can include a first interface page 820*a*. The first interface page 820*a* can include a list of store locations 802 within a predefined radius of the user. The user can select a graphical input element 804, such as an information button, to receive more information about the current conditions inside a selected store. Upon selecting the graphical input element 804, the graphical user interface 122 can transition to a second interface page 820*b*, as shown in FIG. 8B.

The second interface page 820*b* can include store data 806, such as a name, address, and telephone number of the selected store. The second interface page 820*b* may additionally or alternatively include display case data 808. The display case data 808 can indicate the content of the display case. In some examples, the display case data 808 may be a graphical input element that is selectable by the user. For instance, the display case data 808 may be selectable to receive more information about the content of the display case, such as a detailed list of the available objects and their quantities in the display case. As another example, the display case data 808 may be selectable to view an image or video stream 818 of a display case in the selected store. The image or video stream 818 may be expandable (e.g., to full screen) by selecting a maximize button 816 to improve visibility.

In some examples, the second interface page 820*b* can additionally or alternatively include queue length data 812. The queue length data 812 can indicate the lengths of one or more queues in the selected store. The queue length data 812 may be a graphical input element that is selectable by the user. For example, the queue length data 812 may be selectable to view an image or video stream 818 of a queue area in the selected store.

In some examples, the second interface page 820*b* can additionally or alternatively include seating availability data 814. The seating availability data 814 can indicate seating availability in one or more seating areas of the selected store. The seating availability data 814 may be a graphical input element that is selectable by the user. For example, the seating availability data 814 may be selectable to view an image or video stream 818 of a seating area in the selected store.

Figure 9:
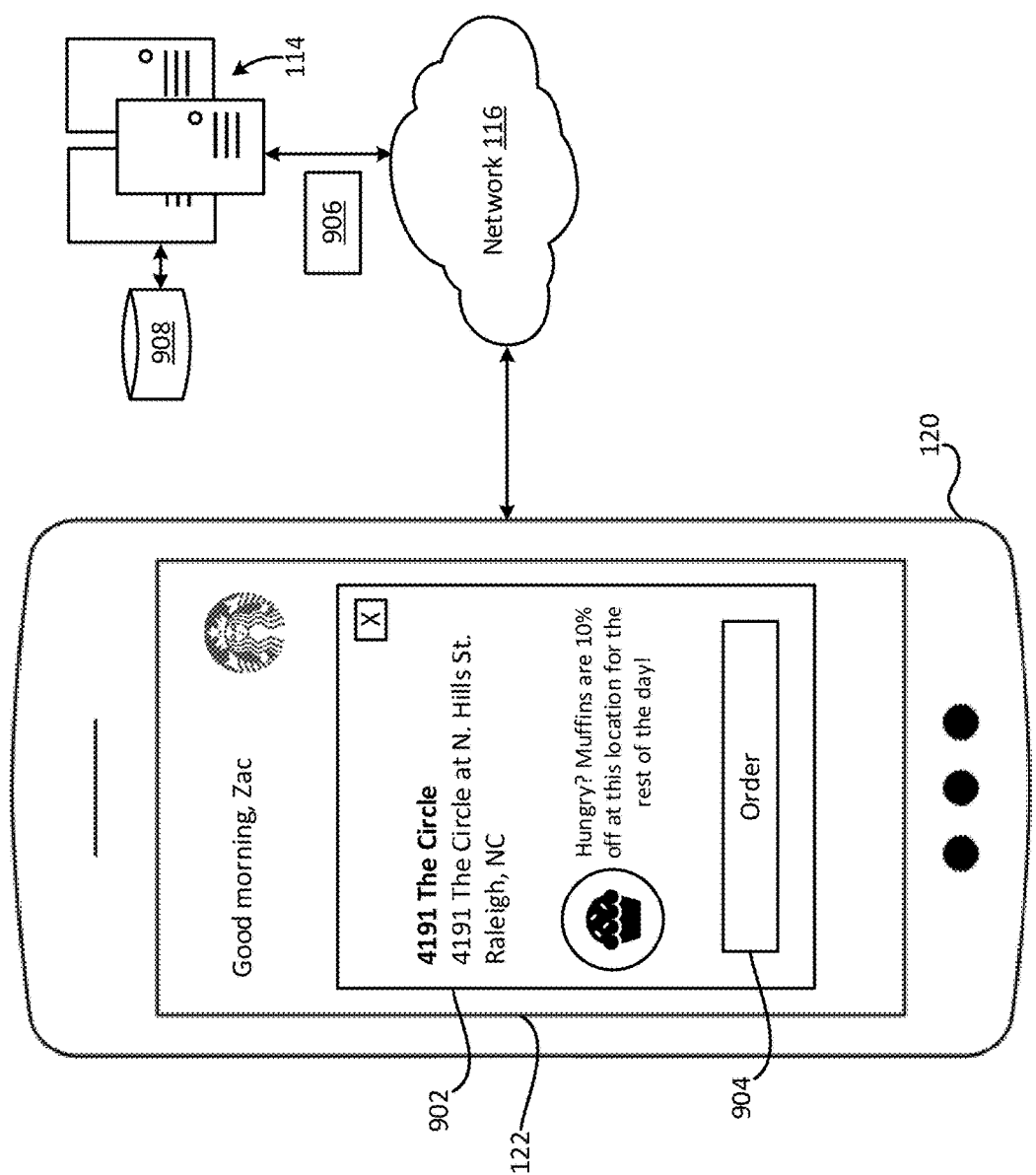
FIG. 9 shows an example of a notification related to an object-of-interest according to some aspects of the present disclosure.

In some examples, the graphical user interface 122 may output a notification to the user about an available object in a display case. For example, referring to FIG. 9, the server system 114 may analyze the user's purchase history 908, determine that the user previously purchased an object that is available in the display case, and transmit a corresponding notification message 906 to the user device 120 via the network 116. The notification message 906 may include a discount to entice the user to purchase the object. The user device 120 can receive the notification message 906 and, in response, output the notification 902 to the user. In this example, the notification 902 is a visual notification within the graphical user interface 122 of the user device 120. But in other examples, the notification 902 may additionally or alternatively include audible or haptic components. The user 118 may then select a graphical option 904 to easily order the object remotely.

To limit the frequency of such notifications, in some examples the server system 114 may only transmit such notifications if one or more conditions are satisfied. For example, the server system 114 may only transmit a notification if the user has previously purchased the object at least a threshold number of times, if the object is available at a preferred location, if it is a certain time of day (e.g., near closing time), or any combination of these. This may help avoid inundating the user with notifications.

Figure 11:
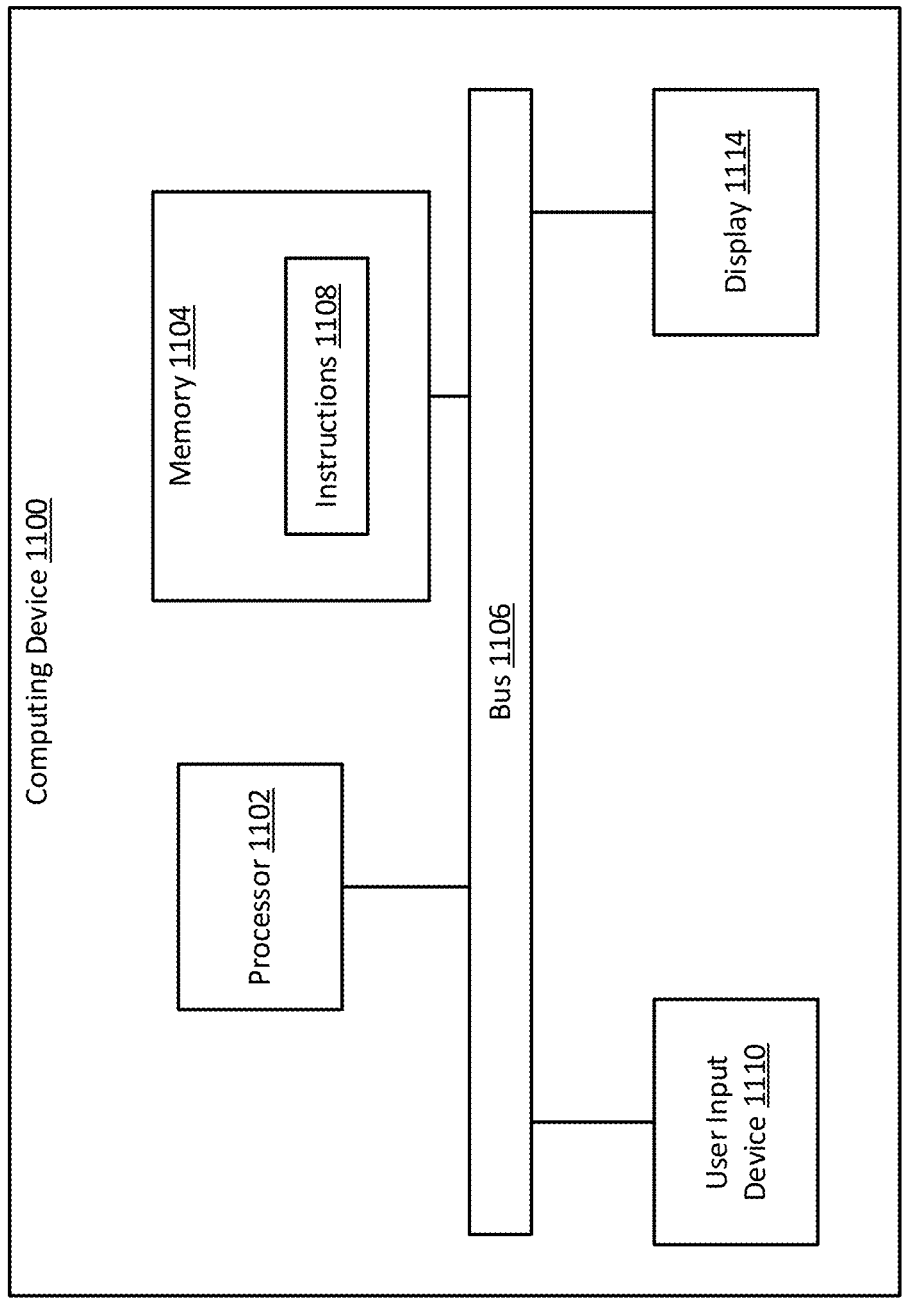
FIG. 11 shows an example of a block diagram of a computing device usable to implement some aspects of the present disclosure.

One example of a block diagram of a computing device usable to implement some aspects of the present disclosure will now be described with respect to FIG. 11. The computing device 1100 may correspond to the user device 120, the server system 114, or the drive-through terminal 128 in some examples.

The computing device 1100 includes a processor 1102 coupled to a memory 1104 by a bus 1106. The processor 1102 can include one processor or multiple processors. Examples of the processor 1102 can include a Field-Programmable Gate Array (FPGA), an application-specific integrated circuit (ASIC), or a microprocessor. The processor 1102 can execute instructions 1108 stored in the memory 1104 to perform operations. The instructions 1108 may include processor-specific instructions generated by a compiler or an interpreter from code written in any suitable computer-programming language, such as C, C++, C#, Java, or Python.

The memory 1104 can include one memory device or multiple memory devices. The memory 1104 can be volatile or non-volatile (it can retain stored information when powered off). Examples of the memory 1104 can include electrically erasable and programmable read-only memory (EEPROM), flash memory, or cache memory. At least some of the memory 1104 includes a non-transitory computer-readable medium from which the processor 1102 can read instructions 1108. A computer-readable medium can include electronic, optical, magnetic, or other storage devices capable of providing the processor 1102 with the instructions 1108 or other program code. Examples of a computer-readable mediums include magnetic disks, memory chips, ROM, random-access memory (RAM), an ASIC, a configured processor, and optical storage.

The computing device 1100 also includes a user input device 1110 and a display 1114. The user input device 1110 may include one user input device or multiple user input devices. Examples of such user input devices can include a mouse, a keyboard, a touchpad, and a touch-screen display. The display 1114 may include one display or multiple display. Examples of such displays can include a LCD or a LED display. In some examples, the computing device 1100 may also include an audio output component such as a speaker, a haptic output component such as a haptic actuator, or another type of output component.

The above description of certain examples, including illustrated examples, has been presented only for the purpose of illustration and description and is not intended to be exhaustive or to limit the disclosure to the precise forms disclosed. Various modifications, adaptations, and uses thereof will be apparent to those skilled in the art without departing from the scope of the disclosure. For instance, other examples may involve more, fewer, different, or different arrangements of components than are shown and described. Additionally, any examples described herein may be combined with any other examples to yield further examples.

The invention claimed is:

1. A method comprising:
   receiving, by a server system, images from a camera that is oriented toward a display case at a physical location;
   analyzing, by the server system, the images to identify a plurality of different types of objects in the display case;
   providing, by the server system, information about the plurality of different types of objects identified in the display case to a user device of a user that is remote from the physical location, the user device being configured to generate a graphical user interface that displays the information to the user; and
   providing, by the server system, at least one of the images to a drive-through terminal at a drive-through of the physical location for display to a driver of a vehicle at the drive-through.

2. The method of claim 1, further comprising:
   analyzing the images to identify at least one type of object that is absent from the display case; and
   generating the information to indicate that the at least one type of object is absent from the display case.

3. The method of claim 1, further comprising:
   for each type of object identified in the display case, analyzing the images to determine a number of units of the type of object in the display case; and
   generating the information to indicate the number of units of each type of object in the display case.

4. The method of claim 3, further comprising:
   updating a database to indicate the number of units of each type of object in the display case to track amounts of the plurality of different types of objects across a plurality of physical locations.

5. The method of claim 1, wherein analyzing the images to identify the plurality of different types of objects in the display case involves:
   identifying a plurality of pixel regions corresponding to a plurality of different types of food items in an image among the images, wherein the plurality of pixel regions are identified in the image using an image processing technique; and
   analyzing the plurality of pixel regions to determine which types of food items are present in and absent from the display case.

6. The method of claim 1, wherein the user device is configured to:
   generate the graphical user interface to include a first interface page, the first interface page including a plurality of store locations that have corresponding graphical input elements;
   detect a selection, by the user, of a graphical input element corresponding to a store location among the plurality of store locations, the store location corresponding to the physical location;
   based on detecting the selection, receive the information from the server system; and
   after receiving the information from the server system, generate a second interface page that includes display case data, wherein the display case data is generated based on the information.

7. The method of claim 6, wherein the selection is a first selection, and wherein the user device is further configured to:
   detect a second selection, by the user, associated with the display case data; and
   based on detecting the second selection, output additional information about the display case in the graphical user interface, the additional information being different than the display case data.

8. The method of claim 7, wherein the display case data is textual data and the additional information is an image of the display case.

9. The method of claim 6, wherein the second interface page further includes seating availability data and queue length data associated with the store location.

10. The method of claim 1, wherein the drive-through terminal is configured to concurrently display a menu of items for sale at the physical location and an image of the display case.

11. A system comprising:
    one or more processors; and
    one or more memories storing instructions that are executable by the one or more processors for causing the one or more processors to:
    receive images from a camera that is oriented toward a display case at a physical location;
    analyze the images to identify a plurality of different types of objects in the display case;
    provide information about the plurality of different types of objects identified in the display case to a user device of a user that is remote from the physical location, the user device being configured to generate a graphical user interface that displays the information to the user; and
    provide at least one of the images to a drive-through terminal at a drive-through of the physical location for display to a driver of a vehicle at the drive-through.

12. The system of claim 11, wherein the one or more memories further include instructions that are executable by the one or more processors for causing the one or more processors to:
    analyze the images to identify at least one type of object that is absent from the display case; and
    generate the information to indicate that the at least one type of object is absent from the display case.

13. The system of claim 11, wherein the one or more memories further include instructions that are executable by the one or more processors for causing the one or more processors to:
    for each type of object identified in the display case, analyze the images to determine a number of units of the type of object in the display case; and
    generate the information to indicate the number of units of each type of object in the display case.

14. The system of claim 11, wherein the one or more memories further include instructions that are executable by the one or more processors for causing the one or more processors to:
- update a database to indicate the number of units of each type of object in the display case to track amounts of the plurality of different types of objects across a plurality of physical locations.

15. The system of claim 11, wherein the one or more memories further include instructions that are executable by the one or more processors for causing the one or more processors to:
- identify a plurality of pixel regions corresponding to a plurality of different types of food items in an image among the images, wherein the plurality of pixel regions are identified in the image using an image processing technique; and
- analyze the plurality of pixel regions to determine which types of food items are present in and absent from the display case.

16. A non-transitory computer-readable medium comprising program code that is executable by one or more processors for causing the one or more processors to:
- receive images from a camera that is oriented toward a display case at a physical location;
- analyze the images to identify a plurality of different types of objects in the display case;
- provide information about the plurality of different types of objects identified in the display case to a user device of a user that is remote from the physical location, the user device being configured to generate a graphical user interface that displays the information to the user; and
- provide at least one of the images to a drive-through terminal at a drive-through of the physical location for display to a driver of a vehicle at the drive-through.

17. The non-transitory computer-readable medium of claim 16, further comprising program code that is executable by the one or more processors for causing the one or more processors to:
- analyze the images to identify at least one type of object that is absent from the display case; and
- generate the information to indicate that the at least one type of object is absent from the display case.

18. The non-transitory computer-readable medium of claim 16, further comprising program code that is executable by the one or more processors for causing the one or more processors to:
- for each type of object identified in the display case, analyze the images to determine a number of units of the type of object in the display case; and
- generate the information to indicate the number of units of each type of object in the display case.

19. The non-transitory computer-readable medium of claim 16, further comprising program code that is executable by the one or more processors for causing the one or more processors to:
- update a database to indicate the number of units of each type of object in the display case to track amounts of the plurality of different types of objects across a plurality of physical locations.

20. The non-transitory computer-readable medium of claim 16, further comprising program code that is executable by the one or more processors to analyze the images to identify the plurality of different types of objects in the display case by:
- identifying a plurality of pixel regions corresponding to a plurality of different types of food items in an image among the images, wherein the plurality of pixel regions are identified in the image using an image processing technique; and
- analyzing the plurality of pixel regions to determine which types of food items are present in and absent from the display case.

\* \* \* \* \*